307/425 OR 3,983,406

United States Patent [19]
Lax et al.

[11] 3,983,406
[45] Sept. 28, 1976

[54] METHOD OF AND APPARATUS FOR GENERATING TUNABLE COHERENT RADIATION BY NONLINEAR LIGHT MIXING IN SYSTEMS HAVING FOLDED NONCOLLINEAR GEOMETRIES

[75] Inventors: Benjamin Lax, Chestnut Hill; Roshan L. Aggarwal, Burlington; Neville K. S. Lee, Framingham, all of Mass.

[73] Assignee: Massachusetts Institute of Technology, Cambridge, Mass.

[22] Filed: June 16, 1975

[21] Appl. No.: 587,030

[52] U.S. Cl. .............................. 307/88.3; 321/69 R
[51] Int. Cl.² ........................................... H03F 7/04

[58] Field of Search .................... 307/88.3; 321/69 R

[56] References Cited
UNITED STATES PATENTS
3,869,618   3/1975   Lax et al. ........................... 307/88.3

*Primary Examiner*—R. V. Rolinec
*Assistant Examiner*—Darwin R. Hostetter
*Attorney, Agent, or Firm*—Arthur A. Smith, Jr.; Robert Shaw; Martin M. Santa

[57] ABSTRACT

Schemes for generating tunable coherent radiation by light mixing wherein input light radiation from one or more lasers is mixed in a nonlinear solid or a gaseous medium by using folded noncollinear geometry.

41 Claims, 12 Drawing Figures

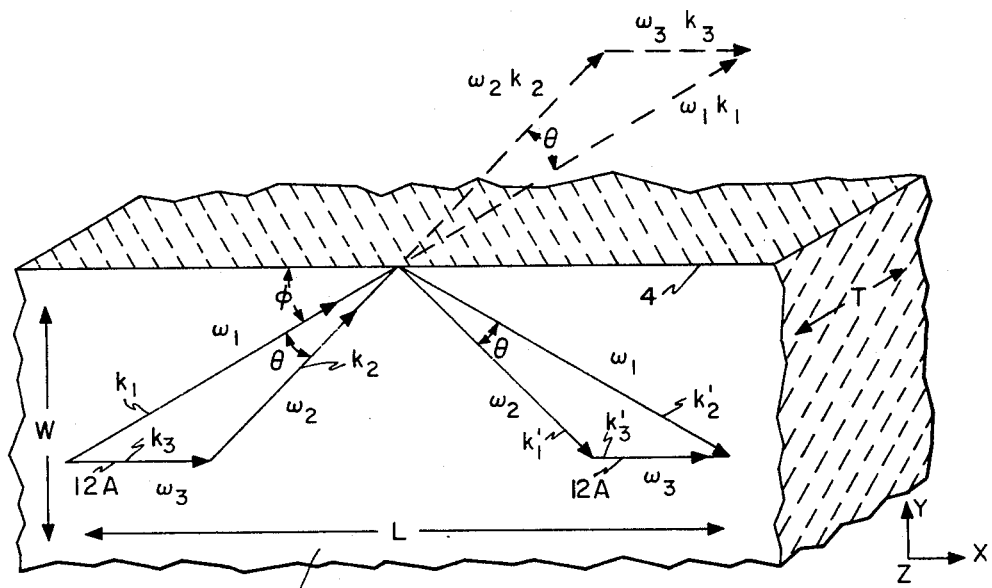
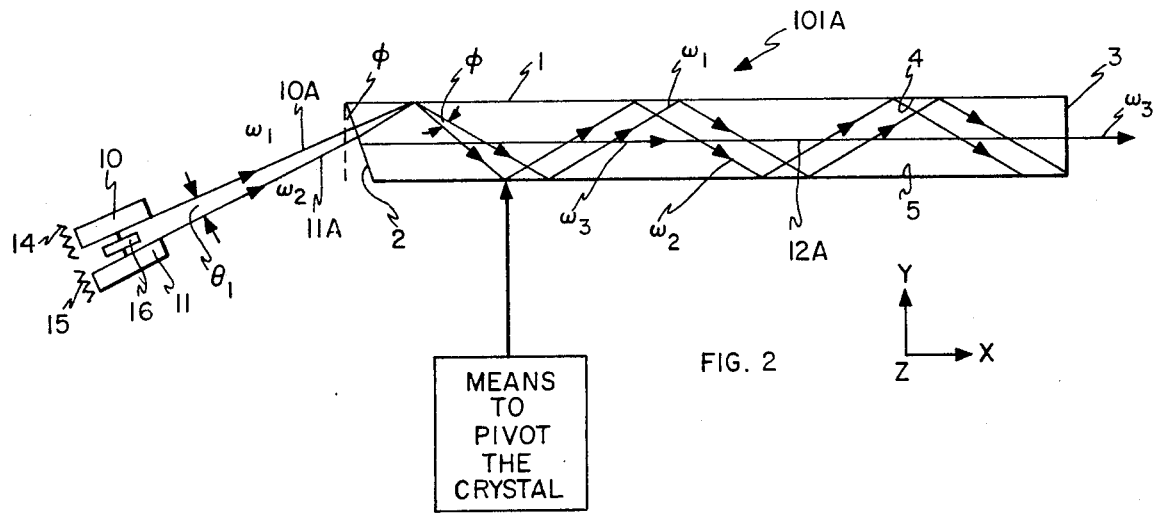
FIG. 1
FIG. 2
FIG. 3

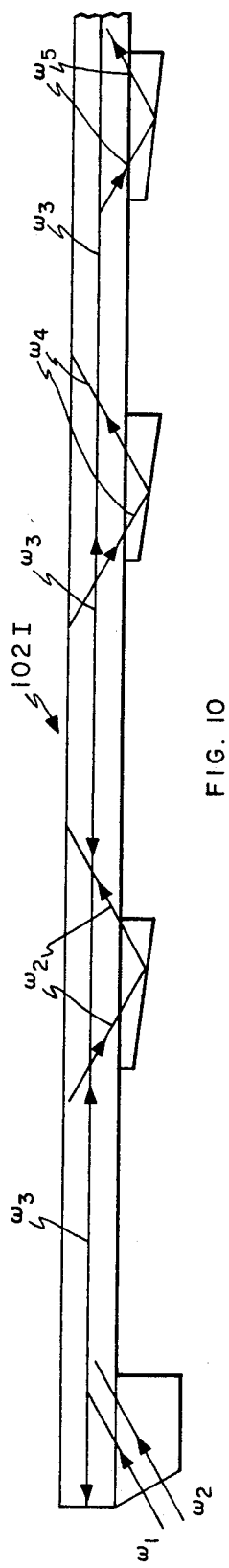
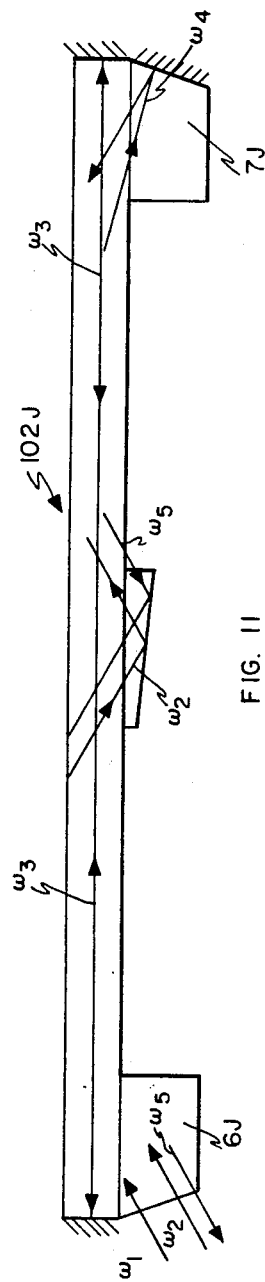
FIG. 10
FIG. 11

METHOD OF AND APPARATUS FOR GENERATING TUNABLE COHERENT RADIATION BY NONLINEAR LIGHT MIXING IN SYSTEMS HAVING FOLDED NONCOLLINEAR GEOMETRIES

This invention was developed, in part, under Contract N00014-67A-0204-0071 with the Office of Naval Research.

The present invention relates to schemes for generating tunable coherent radiation by nonlinear optical mixing.

Attention is called to U.S. Pat. No. 3,869,618, Lax et al. and to the art therein cited. Attention is also called to the following journal articles (copies of which accompany herewith): "Noncollinear Folded Mixing Geometries for Difference-Frequency Far Infrared Generation," Lee et al., *Optics Communication*, August 1974, Volume 11, Number 4, pp. 399 et seq.; "cw generation of tunable narrow-band far-infrared radiation," Agarwal et al., *Journal of Applied Physics*, Vol. 45, No. 9, September 1974, pp. 3972 et seq.; "Singly resonant proustite parametric oscillator tuned from 1.22 to 8.5 $\mu$m," Hanna et al., *Appl. Phys. Lett.*, Vol. 22, No. 9, May 1, 1973, pp. 440 et seq.; "Generation of 1182-A radiation in phase-matched mixtures of inert gases," Kung et al., *Appl. Phys. Lett.*, Vol. 22, No. 6, Mar. 16, 1973, pp. 301 et seq.

In the rapidly developing field of use for lasers there has arisen the need for high power laser radiation at very precise frequencies and at frequencies not in the range of high intensity primary laser sources now available. Hence, workers have resorted to mixing techniques to give the necessary frequencies and, often, the necessary tunability, e.g., said Lax et al patent. This invention arose from an extension of the techniques disclosed in the Lax et al patent and represents an improvement thereon in terms of efficiency of mixing, usable range of output radiation, flexibility, and the like.

Accordingly it is an object of the present invention to provide a laser system adapted to produce tunable coherent radiation in parts of the infrared region of the electromagnetic spectrum.

Another object is to provide a system wherein such coherent radiation can be produced in the ultraviolet and the x-ray region of the spectrum as well.

Still another object is to provide a system wherein mixing of a plurality of input beams is effected in a more efficient and complete fashion than heretofore.

These and still further objects are discussed hereinafter and are delineated in the appended claims.

The foregoing objects are achieved in method of generating tunable coherent radiation by nonlinear mixing employing folded noncollinear geometry, that is, a plurality of noncollinear laser beams are mixed in a highly nonlinear medium by effecting multiple reflections thereof to increase the effective length of the interaction both in terms of the interaction time and the actual length of the path along which such interaction occurs. The nonlinear medium is a crystalline medium (e.g., III–V compounds such as InSb, GaAs, CdTe, etc.) for generation of radiation in the infrared and microwave regions of the electromagnetic spectrum, or said medium can be a gas (e.g., phase-matched mixtures of inert gas or metal vapors with other inert gases) for generation of radiation in the ultraviolet and the x-ray regions of the electromagnetic spectrum. In either case, the nonlinear medium has small absorption for the radiation of the noncollinear laser beams as well as for the beam generated in the course of mixing and is highly nonlinear for the frequencies of interest. The plurality of noncollinear beams can originate from a plurality of primary laser sources or in the gas embodiment, from a single source whose radiation is split and thereafter mixed. In either situation, the folded way of noncollinear mixing using multiple reflection of the input beam or beams increases the efficiency of nonlinear mixing greatly and, indeed, brings into the range of practicality the generation of frequencies which, as a practical matter, could not be generated by other means. In the course of such mixing the two beams at frequencies $\omega_1$ and $\omega_2$, and at an angle $\theta$ to one another, are directed into the nonlinear medium in a converging, noncollinear orientation, and, while in the medium, are caused to propagate, by virtue of multiple reflection, along a zig-zag path. In the course of such zig-zag propagation, the two input beams at $\omega_1$ and $\omega_2$ are mixed to produce radiation at a frequency $\omega_3 = \omega_1 \pm \omega_2 (\omega_1 > \omega_2)$, the radiation at the frequency $\omega_3$ being derived from the radiation at the frequencies $\omega_1$ and $\omega_2$. The phase of the radiation at the frequency $\omega_3$ is determined by the relative phase difference of the two primary or input laser beams created by virtue of the angle $\theta$ being chosen such that the radiation at one frequency $\omega_3$ thereby generated at each part of the medium propagates in one predetermined direction and is in phase with that generated at other parts of the medium, despite the fact that the radiation at the frequencies $\omega_1$ and $\omega_2$ propagate along a zig-zag path.

The invention is hereinafter described with reference to the accompanying drawing in which:

FIG. 1 is an isometric partial view, somewhat diagrammatic in form, showing, greatly enlarged, an elongate crystal wherein radiation at frequencies $\omega_1$ and $\omega_2$ are mixed by folded noncollinear geometry to provide radiation at a frequency $\omega_3$, the latter of which propagates axially (i.e., in the x-direction) along the crystal;

FIG. 2 is a side view, again diagrammatic in form and partly in block diagram form, showing the crystal of FIG. 1 plus other system elements;

FIGS. 3, 4, 5 and 6 show modification of the crystal of FIGS. 1 and 2;

FIGS. 7, 8, 9, 10 and 11 show a crystal, like that of FIGS. 1 and 2, except that in the later figures the crystals are multi-staged.

Figure 4:
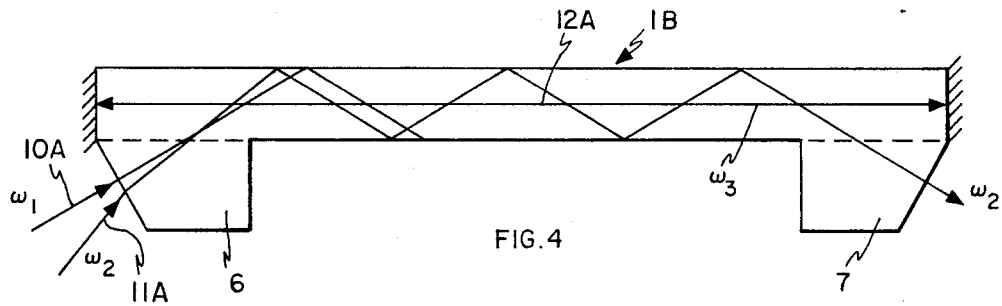

Further work stemming from the subject matter of the Lax et al. patent has resulted in the further discoveries herein disclosed, some of which emanated from attempts to overcome serious constraints in the patented scheme which requires a large crystal to receive two, high-intensity input laser beams, which has a definite problem in attaining 100% quantum conversion efficiency (usually referred to as the Manley-Rowe limit), even in principle, and which has severe limitations as to generation of radiation at the low end of the infrared region of the electromagnetic spectrum. The present system, on the other hand and as later discussed in greater detail, requires that only one of the input laser beams be of high intensity (an important consideration since only one beam need be tunable and the tunable beam can be the low-intensity beam), and the Manley-Rowe limit can be approached in fact. In what now follows, there is first a description with references to FIG. 2 of a simple system employing the present inventive concepts, followed by a more rigorous discussion with reference to FIG. 1 of some of the underlying theory, and then a more detailed explanation of the invention and modifications of the simple system. Turning now to FIG. 2, the apparatus shown at 101A is adapted to effect noncollinear, difference-frequency mixing (there is later described a system for harmonic generation, but using underlying principles of the present invention). The system 101A includes a first laser 10 and a second laser 11 that generate a first laser beam 10A and a second laser beam 11A at frequencies $\omega_1$ and $\omega_2$, where $\omega_1 > \omega_2$. An elongate, nonlinear crystal 1 is positioned to receive the beams 10A and 11A which are directed into the crystal at an angle to the crystal longitudinal axis as shown. The beams 10A and 11A are noncollinear and the angle labeled $\theta_1$ therebetween can be adjusted by an element 16 to achieve the phase-matching necessary for efficient mixing. The first beam 10A is directed upon the nonlinear crystal 1 so as to excite a portion of the crystal and the second beam 11A is directed at an angle to the first beam and to the same portion of the crystal as it is excited by the first beam, the beams being mixed in said portion of the crystal to provide a third or difference-frequency beam 12A at frequency $\omega_3$. As is shown in FIG. 1, the third beam 12A propagates longitudinally (i.e., in the x-direction) along the axis of the crystal 1. The mixing is effected by employing what is called herein folded geometry or a folded configuration or the like; as now explained.

The noncollinear input beams 10A and 11A are directed into the crystal 1 at an input face 2 which is disposed at an angle ($90-\phi$) to the axis, the input beams being directed substantially orthogonal to said face. The orientation of the first laser beam 10A and the second laser beam 11A relative to the crystal is such that the noncollinearly directed beams within the crystal, in combination with the crystal dimensions and reflectance characteristics thereof, provide total internal reflectance of the two beams from inner side walls 4 and 5 of the crystal 1. These side walls 4 and 5 may be metal coated to avoid small phase-mismatch as discussed later. As the input beams reflect back and forth along a zig-zag path between the crystal side walls as shown in a folded configuration, radiation at frequencies $\omega_1$ and $\omega_2$ are mixed to give radiation at the frequency $\omega_3$, as above noted, but, in addition and as later explained in greater detail, is that there is substantial conversion from $\omega_1$ energy to both $\omega_3$ and $\omega_2$, in proper circumstances. Thus, the beam 10A can be laser radiation generated by a $CO_2$ laser which can be very high intensity, whereas the beam 11A can be generated by a continuously tunable spin-flip Raman laser or parametric coherent radiation source of much lesser intensity. One or both beams can be produced by step tunable $CO_2$ lasers with gratings 14 and 15; or a high pressure continuously tunable $CO_2$ laser can be used as the tunable laser. It is important to emphasize by reiteration that the present teaching permits mixing of the high power beam at a frequency $\omega_1$ with a tunable but lesser power beam at a frequency $\omega_2$ to result in a beam at a frequency $\omega_3$ and a higher power beam at $\omega_2$ (thereby amplifying the radiation at $\omega_2$). Indeed, all the energy at the frequency $\omega_1$ can be converted to energy at frequencies $\omega_2$ and $\omega_3$, (i.e., one photon of the frequency $\omega_1$ divides into a photon of the frequency $\omega_2$ and a photon at the frequency $\omega_3$), efficiently and in a relatively small crystal 1. The folded geometry permits noncollinear mixing by multiple reflections, thereby furnishing a longer path along which such noncollinear mixing can occur. The element 16 adjusts and establishes the required phase angle $\theta_1$ between the beams 10A and 11A, but it can be used, also, to establish the necessary alignment of the input beams and the crystal so that the internal reflections within the crystal will occur at proper phase for the internally generated wave at the frequency $\omega_3$. Radiation at the frequency $\omega_3$ leaves the crystal at the end face labeled 3, but, as shown in FIG. 3 wherein the crystal is marked 1A, radiation at the frequency $\omega_2$ can also be coupled out from the crystal. Both of the beams 10A and 11A can be in the infrared region of the electromagnetic spectrum or both can be in the visible region of the electromagnetic spectrum and $\omega_1 > \omega_2 > \omega_3$. By way of illustration, the beam 10A can be generated by a $CO_2$ laser at 9.6 or 10.6 microns, the beam 11A can be generated by a spin-flip Raman laser at 12 or 16 microns (both of which are of great interest today in connection with isotope separation in uranium chemistry), and the difference-frequency beam can be in the near or the far infrared region of the electromagnetic spectrum or even in the microwave region.

Turning attention now to FIG. 1, the crystal is again designated 1, a small, but enlarged, portion only of the crystal being shown. The whole crystal has an overall length L, a width W and a thickness T. Unlike some prior systems wherein multiple reflections are used in nonlinear optics to achieve quasi-phasematching, the multiple internal reflections in this system serve to increase the effective length, $L_{eff}$, of the crystal many fold, the condition of phase-matching having been achieved by means of noncollinear mixing geometry.

In FIG. 1, the two laser beams at $\omega_1$ and $\omega_2$ have corresponding wave vectors $k_1$ and $k_2$ incident on the polished crystal surface from inside, i.e., the surface 4. The angles shown at $\theta$ are $\phi$ chosen to satisfy the conditions for noncollinear phasematching discussed in the Lax et al patent as well as the additive character of the difference frequency $\omega_3$ hereinafter discussed. In proper circumstances, the wave vector $k_3$ of difference frequence $\omega_3$ (where $\omega_3 = \omega_1 - \omega_2$) will be parallel to the crystal surface 4, i.e., the radiation at the frequency $\omega_3$ will propagate axially along the crystal 1. The reflected beams have wave vectors $k_1'$, $k_2'$ and $k_3'$, where $k_3' = k_3$. (The difference frequency beam is again marked 12A). Hence, the wave vectors $k_3, k_3' \ldots$ propagate in the same direction. Further, the electric fields of the difference-frequency beams thereby generated can be shown to add up in phase to give a resultant beam 12A that is the sum of $k_3 + k_3' + \ldots$ when the surface 4 is coated with metal; consequently, the total power in the resultant beam 12A will vary at $L^2$.

In case the crystal surface is not coated with metal, the input laser beams will be reflected due to total internal reflection provided the angle $90 - \phi$ is larger than the critical angle. This is indeed the case for GaAs and CdTe crystals which were used in the experiments carried on by the present inventors. Upon total internal reflection, there occurs a small change in the phase-difference of the reflected laser beams relative to that of the input laser beams. Therefore, the beam 10A generated by the reflected laser beams will acquire a small phase shift $\delta$ $$\delta = 2 \tan^{-1} \left\{ \frac{(n_1^2 \cos^2 \phi - 1)}{n_1 \sin \phi} \right\}^{1/2}$$
$$- 2 \tan^{-1} \left\{ \frac{[n_2^2 \cos^2 (\phi+\theta) - 1]}{n_2 \sin (\phi+\theta)} \right\}^{1/2} \quad (1)$$

relative to the FIR beam generated by the primary laser beams. Here $n_1$ and $n_2$ are the refractive indices at the frequencies $\omega_1$ and $\omega_2$ respectively. Since $n_1 \approx n_2$ and $\theta \ll \phi$, $\delta$ is negligibly small. For multiple reflections, the power loss due to these small shifts can be substantially reduced by a slight deviation from the phase-matching conditions such that the two phase shifts tend to cancel each other. In any case, the resulting loss in power for not coating the crystal surface with metal is less than a few percent in most cases.

FIG. 2, as above noted, shows the simplest case of a folded crystal geometry. The phase-matching conditions for the mixing configuration of FIG. 2 require the laser frequency $\omega_1 > \omega_2$. Here the $\omega_2$-beam is incident at an angle $\theta_1$ to the $\omega_1$ beam such that upon refraction in the crystal 1 the angle $\theta$ between the two beams satisfies the noncollinear phase-matching condition. These two laser beams propagate zig-zag to the right due to reflections between the two plane parallel surfaces 4 and 5. As shown in FIG. 1, the generated beam 12A propagates parallel to the long dimension L of the crystal, and the beam generated by each input beam segment between reflections can be added up in phase. Thus under phase-matched conditions, output power $P\omega_3$ from the crystal 1 relative to that expected for the case of collinear mixing in the same crystal of length L is given by $$P_{\omega_3} \text{(noncollinear)}/P_{\omega_3} \text{(collinear)} = g^2, \quad (2)$$

where $g$ is the geometrical factor determined by the overlap of the input laser beams and their reflections. Assuming that the width W of the crystal is chosen to match the dimensions of the input laser beams, simple geometrical considerations show that $$g = 1 + \tan^2 \phi \quad \text{for } 0 \ll \phi \ll 45°, \quad (3a)$$

and $$g = 2 \quad \text{for } \phi \gg 45°, \quad (3b)$$

provided walk-off of the two laser beams as a result of the angle $\theta$ between them is neglected. In that case the FIR output from the noncollinear folded geometry herein described will always be larger when compared to the collinear case.

The walk-off problem is now considered. In the case of the simple (nonfolded) collinear geometry, the two laser beams propagating at an angle $\theta$ between them would walk-off by an amount $l\theta$ from each other in a distance $l$. However, the situation is quite different in the case of the folded geometry. All those segments of the laser beams which have undergone an odd number of reflections propagate parallel to each other in the same phase. Similarly segments of the laser beams which have undergone an even number of reflections also propagate parallel to each other and in the same phase. While the $\omega_1$-beam walks away from its initial overlapping segment of the $\omega_2$-beam it walks into another $\omega_2$-segment which has suffered an even number of additional reflections. The maximum fraction $f$ of the beam segments which do not overlap is given by $$f = (2-g)/g. \quad (4)$$

Thus, in effect, there is no walk-off for $g = 2$.

By mixing in a crystal of GaAs with the geometry of FIG. 2 the inventors have experimentally demonstrated the principle of folded geometry.

In FIG. 3 there is shown a more sophisticated folded geometry which can provide an even greater enhancement for the $\omega_3$ (as well as $\omega_2$) generation compared with the simple folded geometry of FIG. 2. For the simple folded geometry of FIG. 2, $g$ is determined by $\phi$ according to equations (3a) and (3b). But for the folded geometry of FIG. 3, it is possible to obtain the maximum value of $g = 2$ since the maximum size of beam that can be brought into the crystal is no longer determined by the width W of the crystal. As shown in FIG. 3, one end 2A of the crystal labeled 1A is coated with metal and both ends 2A and 3A of the crystal 1A are perpendicular to the beam 12A. Thus, the end faces 2A and 3A of the crystal can form a resonant cavity for the $\omega_3$ beam. For the case that the length of the cavity $L = \frac{1}{2}(n+\frac{1}{2})\lambda_3$, where $n = 0, 1, 2, \ldots$ and $\lambda_3$ is the $\omega_3$ wavelength inside the crystal, the effective interaction length of the crystal is $$L_{eff} = \frac{4L}{1-r}. \quad (5)$$

Here $r = (n_3 - 1)/(n_3 + 1)$ is the reflection coefficient of the output face, where $n_3$ is the refractive index of the crystal at the FIR frequency $\omega_3$. So in comparison to the sample in the Lax et al. patent, with $L_{eff} = 0.75$ cm, one can expect for a 2.6-cm crystal an enhancement of $\sim 10^3$, and for a 10-cm crystal an enhancement of $1.5 \times 10^4$ in the FIR output. However, when L is not equal to $\frac{1}{2}(n + \frac{1}{2})\lambda_3$, the enhancement would not be so great. The enhancement factors that are discussed above have not included the fact that the output at $\omega_3$ would also increase by increasing the crystal length for the simple noncollinear geometry of said patent. For such a long crystal, $L_{eff}$ is proportional to $(L)^{1/2}$ if the walk-off problem of the two input laser beams is neglected. Therefore the output there would increase at best linearly with the length of the crystal. However, the walk-off problem would be serious for a long crystal. Also the size of the output beam at $\omega_3$ would increase with the length of the crystal; therefore, it would be necessary to increase the width of the crystal in order to let the output beam emerge from the output surface without suffering total internal reflection. But those problems do not occur with folded geometry.

In the embodiment of FIG. 3, the radiation at the difference frequency $\omega_3$ can be reflected back and forth within the cavity labeled 8, formed in the crystal 1A between ends 2A and 3A using metal coating (external mirrors can also be used), and coherent radiation at the frequency $\omega_3$ can be allowed to emit from the right hand face 3A. In this fashion, as above indicated, the efficiency of mixing within the crystal for conversion of radiation at the frequency $\omega_1$ to radiation at the frequencies $\omega_2$ and $\omega_3$, is increased. The arrangement in FIG. 3 contains coupling means 6 to couple the radiation at the frequency $\omega_1$ and $\omega_2$ into the crystal 1A and to couple the same to said cavity 8 at appropriate angles so that the radiation at the frequencies $\omega_1$ and $\omega_2$ are internally reflected between sides 4A and 5A thereof to generate the difference frequency $\omega_3$ to travel or propagate in the direction of the longitudinal axis, i.e., the line again marked 12A in FIG. 3. However, as shown in FIG. 4 wherein the crystal is marked 1B, coupling means 7 can be provided to couple out the radiation at the frequency $\omega_2$ (which has been amplified as before explained) irrespective of whether the radiation at the frequency $\omega_3$ is or is not coupled out.

Figure 5:
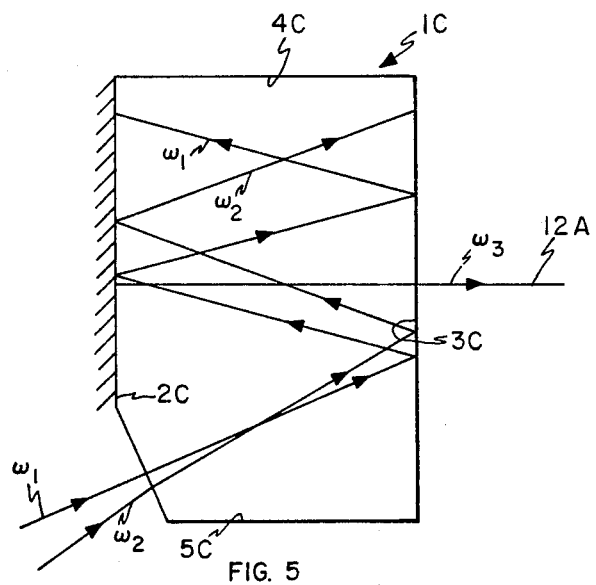
Figure 6:
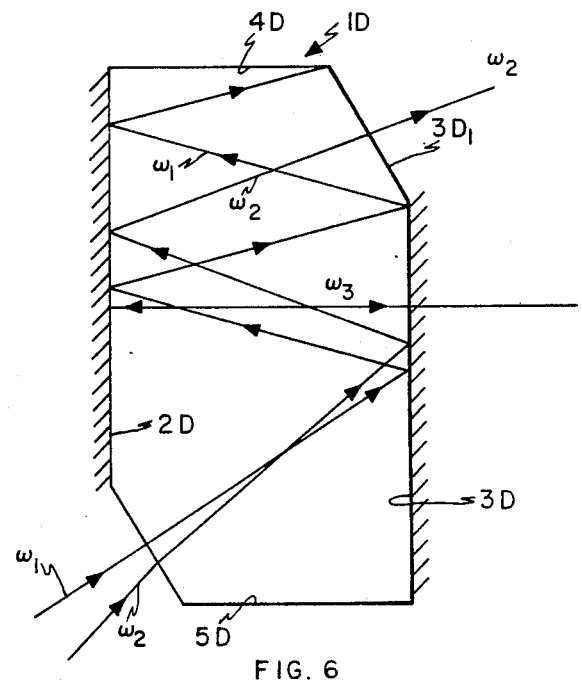

The crystal shown at 1C in FIG. 5 has sides 4C and 5C that are substantially parallel to the longitudinal axis (again marked 12A) thereof, and end faces 2C and 3C are substantially orthogonal to said longitudinal axis. One of the end faces, the face 2C, has an inclined face $2C_1$ to receive radiation at the frequencies $\omega_1$ and $\omega_2$ and to direct the same upon the other face 3C which reflects the same internally within the crystal 1C, the radiation thus being reflected back and forth between the end faces 2C and 3C to provide mixing in a process that effects conversion of the radiation at the frequency $\omega_1$ to the radiation at frequencies $\omega_2$ and $\omega_3$ in a system employing folded noncollinear geometry, as before. Again the radiation at the frequency $\omega_3$ is removed from the crystal 1C. The crystal labeled 1D in FIG. 6 is similar to the crystal 1C except that its end face 3D has an inclined face $3D_1$ to couple out the radiation at the frequency $\omega_2$. The further crystal end face in FIG. 6 is marked 2D and the parallel sides thereof 4D and 5D.

Figure 7:
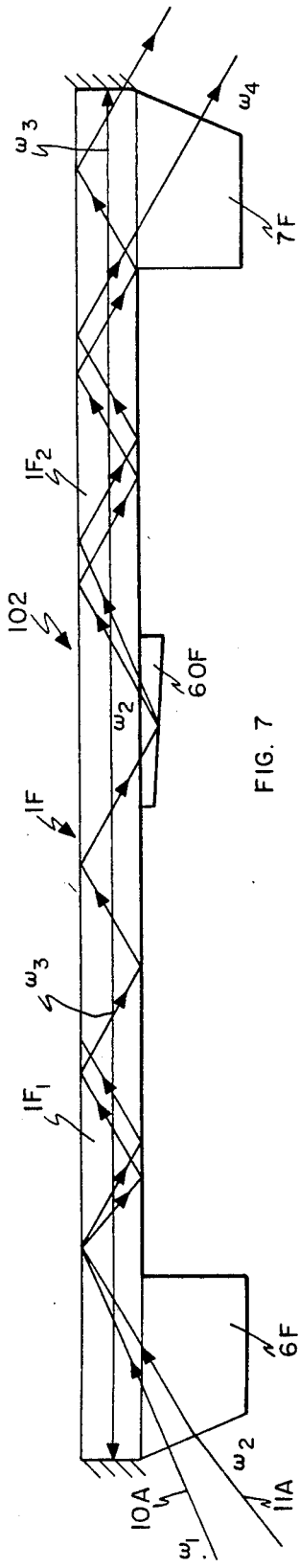
Figure 8:
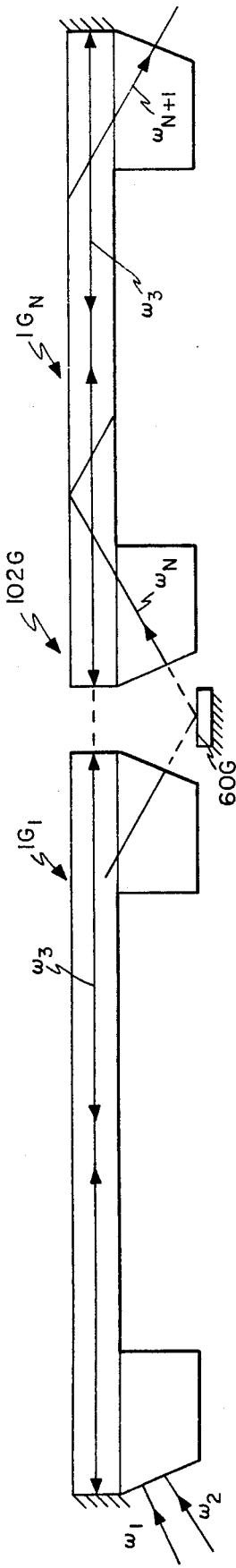
Figure 9:
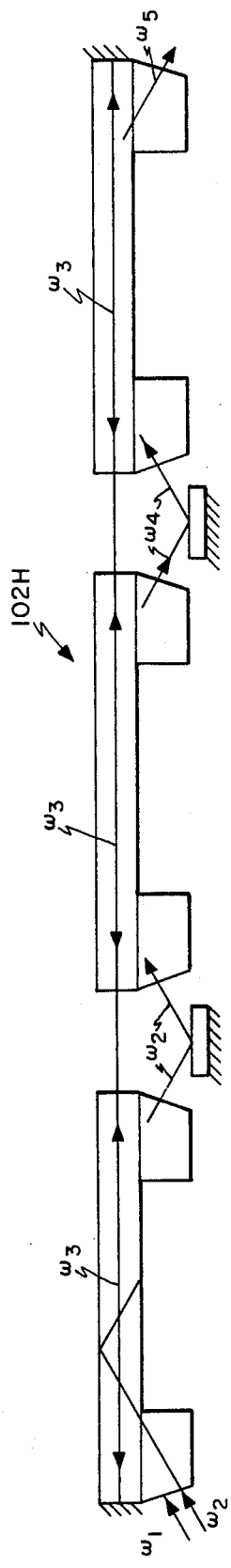

FIGS. 7 to 11 show various forms of systems comprising a cascade of nonlinear crystal stages or sections. In the apparatus of FIG. 7 a single elongate crystal 1F with appropriate means for adjusting or re-orienting the direction of the radiation at $\omega_2$, etc., as later explained, serves the necessary function. In FIG. 8 nonlinear crystals $1G_1 \ldots 1G_N$ serve the same purpose. FIGS. 9–11 are variations or extensions of the systems of either FIG. 7 or FIG. 8.

The apparatus shown at 102 in FIG. 7 comprises a cascade of nonlinear crystal stages (here two stages) in the form of the elongate crystal 1F. Laser radiation at frequencies $\omega_1$ and $\omega_2$ are fed into an input coupling 6F to the first stage $1F_1$ of the system to produce by noncollinear mixing using folded geometry, as before, radiation at the frequency $\omega_3$ and amplified radiation at the frequency $\omega_2$. The next stage, stage $1F_2$, is positioned to receive the amplified radiation at the frequency $\omega_2$ whose angle of propagation is adjusted or re-oriented by a reflector 60F and mixed with the radiation at the frequency $\omega_3$ in the stage $1F_2$ to produce, by non-collinear mixing using folded geometry radiation at a frequency $\omega_4$ and amplified radiation at the frequency $\omega_3$. The next stage of the cascade of stages (see system 102I in FIG. 10) receives the amplified radiation at the frequency $\omega_3$ and the radiation at the frequency $\omega_4$ and produces radiation at a frequency $\omega_5$. Similarly this process can be carried out to the Nth stage (see the system shown at 102G in FIG. 8 wherein the input radiation to the Nth stage is at $\omega_N$ and $\omega_3$ and the output is $\omega_{N+1}$). The single elongate crystal in FIG. 7 is replaced by its equivalent, a plurality of N crystals $1G_1 \ldots 1G_N$ in FIG. 8. Again, the radiation at $\omega_2$, $\omega_4$, $\omega_5$, $\omega_6$ ... is re-oriented by elements 60G ... to provide the proper phase matching condition for mixing in the next successive stage of the cascade of stages. The frequency $\omega_3$ appears in all stages. In FIG. 8, the crystals $1G_1 \ldots 1G_N$ can form a resonant cavity for the frequency $\omega_3$; the output of the system is radiation at the frequency N+1 which is coupled out in the manner shown. The system marked 102H in FIG. 9 is a three-stage system with multiple crystals and the system 102I is an N-stage system in the form of a single elongate crystal, three stages only being shown. In the system shown at 102J in FIG. 11 the frequencies $\omega_1$ and $\omega_2$ are introduced through coupling means 6J to a single, multi-stage crystal and the frequency marked $\omega_6$, instead of being coupled out by the element marked 7J, is reflected back through the system to be coupled out by the element 6J.

By way of example of multi-stage operation, let it be assumed that $\omega_1$ is the 10.6 micron output of a high-intensity $CO_2$ laser and that $\omega_2$ is a lower intensity beam at 12 microns; the frequency $\omega_3$ in this circumstance will be 100 microns. Assuming a three-stage system, the input to the first stage is 10.6 microns and 12 microns and the output is 12 microns and 100 microns; the input to the second stage is 12 microns and 100 microns and the output is 14 microns and 100 microns; the input to the third stage is 14 microns and 100 microns and the output from the third stage is 16 microns and 100 microns; and so forth.

The above-described system employs difference-frequency mixing in a crystal; the folded noncollinear geometry referred to can also be used to generate sum frequencies a crystalline medium. Such sum frequencies can also be generated in a nonlinear gas (for example, Xe) using folded noncollinear geometry, as now explained with reference to FIG. 12.

Figure 12:
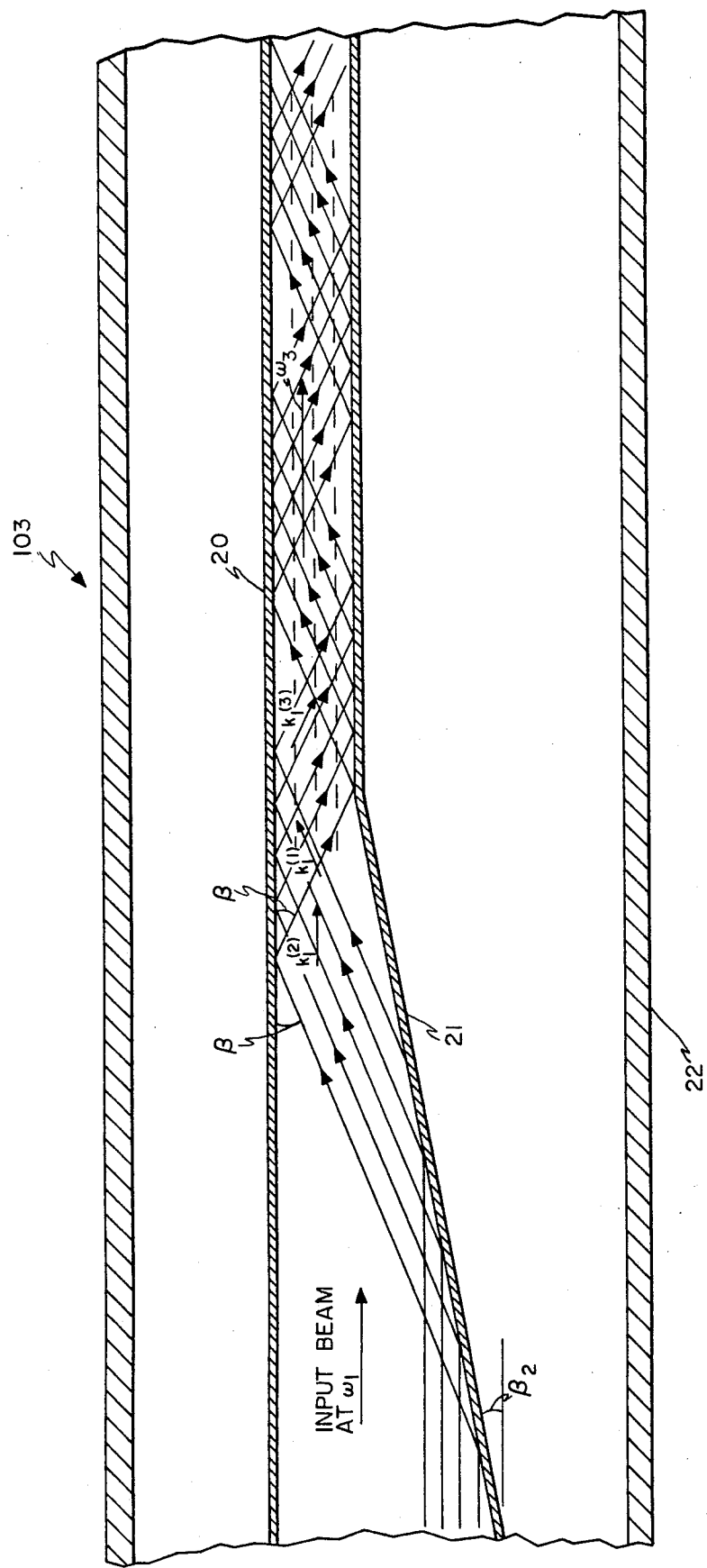
FIG. 12 is a side section view of a system for mixing by folded noncollinear geometry in a gaseous medium.

The general case for sum frequency generation is $\omega_3 = m_1\omega_1 + m_2\omega_2$, where $m_1$ and $m_2$ are integers and $m_1 + m_2 = \pm 1 \pm 3 \pm 5$, etc. for the gaseous case. FIG. 12 illustrates a special case of harmonic generation wherein $\omega_1 = \omega_2$.

In the system numbered 103 in FIG. 12 a single input beam at $\omega_1$ is used (it may be the output of a YAG laser, for example) and that input is divided to produce two beams by an adjustable metal plate 21 of a metal waveguide-like device 20 to result in multiple-beam mixing in a phase-matched condition. The system 103 comprises a gas cell 22 that contains the waveguide-like device 20 and the gas. The gas in the gas cell 22 is highly nonlinear for the frequencies of interest and has small absorption for these same frequencies. The just-described noncollinear phase matching scheme in a gaseous medium is as efficient as collinear phase matching schemes heretofore proposed. But the present invention permits use of a pure active gas medium in contrast to the collinear case which requires phase-matched mixtures of gas by mixing an active gas medium with a lot of inactive gas. As a result, the present invention can be several orders of magnitude more efficient than the previously suggested arrangements. Moreover, because of the higher efficiency and because of the intrinsic way of mixing, the present scheme is far more adaptable for multi-stage cascade scheme of mixing which in result would generate not only a higher power output beam but also beams of higher frequency as well in comparison with the previous arrangements.

The folded noncollinear geometry discussed above can provide several orders of magnitude enhancement in the outputs at $\omega_3$ ... compared to the noncollinear mixing techniques previously used, and it can provide, as well, amplification of the radiation at $\omega_2$. As above noted, important high-intensity beams at 12 microns and 16 microns can be produced by a single-stage system wherein the frequency $\omega_2$ is used; but the cascade scheme described is better for that purpose. The apparatus herein described can produce radiation in the near infrared, the far infrared, and the microwave region of the spectrum, but it can produce radiation, as well, in the ultraviolet and x-ray regions.

Further modifications of the invention herein disclosed will occur to persons skilled in the art and all such modifications are deemed to be within the spirit and scope of the invention as defined by the appended claims.

What is claimed is:

1. A method of generating tunable coherent radiation by noncollinear difference-frequency mixing that comprises: generating a first laser beam and a second laser beam at frequencies $\omega_1$ and $\omega_2$, respectively, where $\omega_1 > \omega_2$; adjusting the frequency of at least one of the two laser beam so that the difference between the frequencies of the two beams is equal to a difference frequency $\omega_3$; directing the two laser beams upon a nonlinear crystal in a folded noncollinear configuration to generate radiation at the difference-frequency $\omega_3$ in a mixing process that effects conversion of the radiation at the frequency $\omega_1$ to radiation at the frequencies $\omega_2$ and $\omega_3$; directing the first beam upon the nonlinear crystal so as to excite the crystal, said crystal having a large nonlinear coefficient and small absorption coefficient at the frequencies of the two laser beams as well as at said difference frequency; directing the second beam at an angle to the first beam and to at least a substantial part of the same portion of the crystal excited by the first beam, the two beams being mixed in the crystal to provide said difference frequency, the two beams being so directed relative to the crystal that, in combination with the crystal dimensions and reflectance characteristics, there is substantially total reflectance of the two beams so that the radiation at the frequency $\omega_1$ and the radiation at the frequency $\omega_2$ follow a zig-zag path along the crystal and the radiation at the frequency $\omega_1$ is converted efficiently to radiation at the frequencies $\omega_2$ and $\omega_3$ in the course of being internally reflected, thereby amplifying the radiation at the frequency $\omega_2$ and generating the radiation at the frequency $\omega_3$; and adjusting the angle between the first beam and the second beam to achieve the phase-matching necessary for efficient generation of the difference frequency.

2. A method as claimed in claim 1 in which the radiation at the frequencies $\omega_1$, $\omega_2$, and $\omega_3$ are reflected internally within the crystal sufficiently long and through a sufficient volume of the crystal to effect substantially complete conversion of the radiation at the frequency $\omega_1$ to radiation at the frequencies $\omega_2$ and $\omega_3$.

3. A method as claimed in claim 1 in which both said beams are in the near infrared region of the electromagnetic spectrum or both said beams are in the visible regions of the electromagnetic spectrum and in which $\omega_1 > \omega_2 > \omega_3$.

4. A method as claimed in claim 1 in which the crystal forms at least part of a cavity that is resonant to the radiation at said difference frequency $\omega_3$ so that the radiation at the difference frequency $\omega_3$ is reflected back and forth longitudinally within the cavity, thereby to increase the effective mixing length of the crystal and, hence, the efficiency of mixing within the crystal to increase the efficiency of conversion of radiation at the frequency $\omega_1$ to radiation at the frequencies $\omega_2$ and $\omega_3$.

5. A method as claimed in claim 4 which further includes withdrawing radiation at the frequency $\omega_3$ from said crystal.

6. A method as claimed in claim 1 that further includes mixing the amplified radiation at the frequency $\omega_2$ with radiation at the frequency $\omega_3$ to provide radiation at a further difference frequency $\omega_4$.

7. A method as claimed in claim 6 that further includes mixing the radiation at the further difference frequency energy of $\omega_4$ with difference-frequency energy at $\omega_3$ to provide energy at a still further difference-frequency $\omega_5$, etc., eventually to provide radiation at a difference-frequency $\omega_N$.

8. Apparatus for generating tunable coherent radiation by noncollinear difference-frequency mixing that comprises, in combination: first laser means and second laser means for generating a first laser beam and a second laser beam at frequencies $\omega_1$ and $\omega_2$, respectively, where $\omega_1 > \omega_2$; a nonlinear crystal positioned to receive the beams which are noncollinearly directed upon the crystal to generate therein by folded noncollinear geometry radiation at a difference-frequency $\omega_3$ in a mixing process that effects conversion of the radiation at the frequency $\omega_1$ to radiation at the frequencies $\omega_2$ and $\omega_3$, said crystal having a large nonlinear coefficient and small absorption coefficient at the frequencies of the two laser beams as well as at the difference frequency $\omega_3$; the first beam being directed upon the nonlinear crystal so as to excite a portion of the crystal, the second beam being directed at an angle to the first beam and to part of the same portion of the crystal as is excited by the first beam, the beams being mixed in said portion of the crystal to provide said difference frequency, the orientation of the first laser beam and the second laser beam relative to each other and to the crystal being such that the noncollinearly directed beams within the crystal, in combination with the crystal dimensions and the reflectance characteristics thereof, provide substantially total reflectance of the two beams so that radiation at the frequency $\omega_1$ and radiation at the frequency $\omega_2$ follow a zig-zag path along the crystal and the radiation at the frequency $\omega_1$ is converted efficiently to electromagnetic radiation at the frequencies $\omega_2$ and $\omega_3$ in the course of being internally reflected, thereby amplifying the radiation at the frequency $\omega_2$ and generating the radiation at the frequency $\omega_3$; and means for adjusting the angle between the first beam and the second beam to achieve the phase matching necessary for efficient generation of said difference frequency $\omega_3$ and amplification of the radiation at the frequency $\omega_2$.

9. Apparatus as claimed in claim 8 in which both said beams are in the near-infrared region of the electromagnetic spectrum or both said beams are in the visible region of the electromagnetic spectrum, which includes means for adjusting the frequency of at least one of the beams such that the frequency at said difference frequency $\omega_3$ is tunable, and in which $\omega_1 > \omega_2 > \omega_3$.

10. Apparatus as claimed in claim 9 in which the first laser means is a $CO_2$ laser that generates a beam at the frequency $\omega_1$ at one level of intensity and the second laser means is tunable and generates a beam at the frequency $\omega_2$ of much lesser intensity, radiation at the frequency $\omega_1$ being converted within the crystal to radiation at the frequency $\omega_2$ to amplify the same, said apparatus further including means to couple out the radiation at the frequency $\omega_2$.

11. Apparatus as claimed in claim 10 in which the radiation at the frequency $\omega_2$ thereby coupled out of the crystal is in either the 12 or the 16 micron region of the electromagnetic spectrum.

12. Apparatus as claimed in claim 11 in which said beams are generated by step tunable $CO_2$ laser with grating, or by continuously tunable spin flip Raman laser, or by tunable parametric source of coherent radiation or by high pressure continuously tunable $CO_2$ lasers or by the combination of the above.

13. Apparatus as claimed in claim 8 in which the crystal dimensions and reflectance characteristics are such that, with appropriately directed laser beams at the frequencies $\omega_1$ and $\omega_2$, the radiation at the frequencies $\omega_1$, $\omega_2$ and $\omega_3$ are reflected internally with the crystal sufficiently long and through a sufficient volume of the crystal to effect substantially complete conversion of the radiation at the frequency $\omega_1$ to radiation at the frequencies $\omega_2$ and $\omega_3$.

14. Apparatus as claimed in claim 8 in which said crystal has one end thereof cut at an acute angle $\phi$ to the crystal's longitudinal axis and the other end of the crystal cut orthogonal to the longitudinal axis, the sides of the crystal being substantially parallel to the longitudinal axis, the first laser beam and the second beam being directed into the crystal at said one end and being internally reflected inside the crystal by the sides thereof to generate radiation at the difference frequency $\omega_3$ to travel in the direction of the longitudinal axis and emit from the crystal at said other end.

15. Apparatus as claimed in claim 14 in which $$\phi = \sqrt{2\Delta n/n}$$

wherein
$$n_1 \simeq n_2 = n, \Delta n = n_3 - n_1$$

wherein $n_1$, $n_2$ and $n_3$ are the refractive indices of the crystal at frequencies $\omega_1$, $\omega_2$ and $\omega_3$, respectively.

16. Apparatus as claimed in claim 8 in which the crystal forms at least part of a cavity that is resonant as to the radiation at said difference frequency $\omega_3$ so that the energy at the difference frequency $\omega_3$ is reflected back and forth longitudinally within the cavity thereby to increase the mixing length of the crystal and, hence, the efficiency of mixing within the crystal to increase the efficiency of conversion of radiation at the frequency $\omega_1$ to radiation at the frequencies $\omega_2$ and $\omega_3$.

17. Apparatus as claimed in claim 16 in which the sides of the crystal are substantially parallel to the longitudinal axis of the crystal and the end faces are orthogonal to the longitudinal axis, and that further includes coupling means to couple in the radiation at the frequencies $\omega_1$ and $\omega_2$ into the crystal and to couple the same to said cavity at appropriate angles so that the radiation at the frequencies $\omega_1$ and $\omega_2$ are internally reflected inside the crystal by the sides thereof to generate the difference frequency $\omega_3$ to travel in the direction of the longitudinal axis.

18. Apparatus as claimed in claim 17 that includes means to couple out the radiation at the frequency $\omega_3$.

19. Apparatus as claimed in claim 17 that includes means to couple out the radiation at the frequency $\omega_2$.

20. Apparatus as claimed in claim 16 in which the sides of the crystal are substantially parallel to the longitudinal axis of the crystal and the end faces of the crystal are substantially orthogonal to said longitudinal axis, one of said end faces having an inclined face to receive the radiation at frequencies $\omega_1$ and $\omega_2$ and to direct the same upon the other of said end face which reflects the same internally within the crystal, the radiation at the frequencies $\omega_1$ and $\omega_2$ being thereby internally reflected between said end faces and generating said difference frequency $\omega_3$ to travel in the direction of the longitudinal axis.

21. Apparatus as claimed in claim 20 that includes means to couple out the radiation at the frequency $\omega_3$.

22. Apparatus as claimed in claim 20 that includes means to couple out the radiation at the frequency $\omega_2$.

23. Apparatus as claimed in claim 8 in which the crystal is an elongate crystal that receives the input radiation at the frequencies $\omega_1$ and $\omega_2$ at or near one end thereof and effects internal reflection of the input radiation along said zig-zag path toward the other end thereof, the radiation at the frequency $\omega_3$ being generated to travel axially along the crystal, and which includes means at a point intermediate the ends of the crystal to adjust or re-orient the angle of propagation of the radiation at the frequency $\omega_2$ with respect to the radiation at the frequency $\omega_3$ to generate radiation at a difference frequency $\omega_4$ in a mixing process in which the adjusted or re-oriented radiation at the frequency $\omega_2$ is converted to radiation at the frequencies $\omega_3$ and $\omega_4$.

24. Apparatus as claimed in claim 8 that includes means to couple out radiation at the frequencies $\omega_2$ and $\omega_3$ and that includes a further nonlinear crystal positioned to receive the radiation at the frequencies $\omega_2$ and $\omega_3$ and to mix the same to provide a further difference frequency $\omega_4$, that is, the radiation at the frequency $\omega_2$ is converted into radiation at the frequencies $\omega_3$ and $\omega_4$.

25. Apparatus as claimed in claim 24 in which said further nonlinear crystal is coaxial with the first named nonlinear crystal and in which radiation at the frequency $\omega_3$ passes in a generally axial direction from the first-named nonlinear crystal to said further nonlinear crystal.

26. Apparatus as claimed in claim 25 in which the two nonlinear crystals form part of a cavity that is resonant to the radiation at the frequency $\omega_3$.

27. Apparatus as claimed in claim 8 that includes means for pivoting the crystal to optimize the efficiency of mixing.

28. Apparatus as claimed in claim 8 in which the surfaces of the crystal are well polished to maximize the internal reflectance characteristics thereof.

29. Apparatus that includes a cascade of nonlinear crystal stages, the first of which is positioned to receive radiation at frequencies $\omega_1$ and $\omega_2$ and produce by noncollinear mixing using folded geometry radiation at a frequency $\omega_3$ and amplified radiation at the frequency $\omega_2$, the next of which is positioned to receive the amplified radiation at the frequency $\omega_2$ and the radiation at the frequency $\omega_3$ and produce by noncollinear mixing using folded geometry radiation at a frequency $\omega_4$ and amplified radiation at the frequency $\omega_3$, the next of which is positioned to receive the amplified radiation at the frequency $\omega_3$ and the radiation at the frequency $\omega_4$ and produce by noncollinear mixing using folded geometry radiation at a frequency $\omega_6$ and amplified radiation at the frequency $\omega_3$, and so forth until, finally, radiation is produced at a frequency $\omega_{N+1}$, where N is the number of crystal stages.

30. Apparatus as claimed in claim 29 wherein said cascade is in the form of a single elongate crystal having means within the crystal to adjust or re-orient the angle of propagation of the amplified radiation at frequencies $\omega_2$, $\omega_4$, etc., to permit noncollinear mixing with radiation at the frequency $\omega_3$ in the stage or stages.

31. Apparatus as claimed in claim 29 wherein said cascade is in the form of a plurality of individual crystals, the first of the plurality receiving as input the radiation at the frequencies $\omega_1$ and $\omega_2$ and providing as output amplified radiation at the frequency $\omega_2$ and the radiation at the frequency $\omega_3$, the second of the plurality receiving as input the amplified radiation at the frequency $\omega_2$ and the radiation at the frequency $\omega_3$ etc., to the Nth crystal.

32. Apparatus as claimed in claim 29 that further includes means to couple out radiation from the last stage of said cascade and in which the radiation thereby coupled out is either at the 12 micron or at the 16 micron region of the electromagnetic spectrum.

33. Apparatus as claimed in claim 29 in which the crystal stages each have a large nonlinearity and small absorption for the radiation at the frequencies $\omega_1$, $\omega_2$, $\omega_4$, etc., and the crystalline surfaces of the stage are well polished to maximize the internal reflectance characteristics thereof.

34. A method of generating tunable coherent radiation, that comprises: generating first and second laser beams at frequencies $\omega_1$ and $\omega_2$, respectively; orienting the two laser beams collinearly at a converging angle $\theta$ to one another; directing the two laser beams noncollinearly into a nonlinear medium wherein the beams are mixed in a folded configuration that uses multiple reflections of the input beams within the medium so that noncollinear mixing occurs along a zig-zag path to produce radiation at a frequency $\omega_3$, the radiation at the frequency $\omega_3$ being derived from the combination of the radiation at the frequency $\omega_1$ and the radiation at the frequency $\omega_2$, the phase of the radiation at the frequency $\omega_3$ being determined by the relative phase difference of the two laser beams created by virtue of the angle $\theta$, said angle $\theta$ being chosen such that the radiation at the frequency $\omega_3$ generated at each part of the medium propagates in one predetermined direction and in phase despite the fact that the radiation at the frequencies $\omega_1$ and $\omega_2$ propagate along a zig-zag path.

35. A method as claimed in claim 34 wherein said nonlinear medium is a nonlinear crystalline medium, wherein $\omega_1 > \omega_2$, and wherein the radiation at the frequency $\omega_3$ is generated as a difference frequency in a mixing process in which radiation at the frequency $\omega_1$ is converted into radiation at the frequency $\omega_2$ and radiation at the frequency $\omega_3$, said crystalline medium having a large nonlinear coefficient and a small absorption factor for radiation at the frequencies $\omega_1$, $\omega_2$, and $\omega_3$.

36. A method as claimed in claim 34, wherein said medium is a highly nonlinear gas that has small absorption for the radiation at the frequencies $\omega_1$, $\omega_2$ and $\omega_3$, and wherein the radiation at the frequency $\omega_3$ is generated as a sum, $\omega_3 = m_1\omega_1 + m_2\omega_2$, where $m_1$ and $m_2$ are integers.

37. A method as claimed in claim 34 wherein $\omega_1 = \omega_2$.

38. Apparatus for generating coherent radiation at a frequency $\omega_3$, that comprises: means providing a first laser beam at frequency $\omega_1$ and a second laser beam at frequency $\omega_2$; means to adjust the two laser beams in a noncollinear converging configuration with an angle $\theta$ therebetween; nonlinear medium means operatively disposed to receive the radiation of the two laser beams, the radiation at the frequency $\omega_1$ and the radiation at the frequency $\omega_2$ being mixed in the nonlinear medium means to provide the radiation at the frequency $\omega_3$; means reflecting the two beams along a zig-zag path through said medium means such that mixing is effected by way of folded noncollinear geometry; means for adjusting the angle $\theta$ and for adjusting the direction of propagation of the two laser beams into the nonlinear medium means such that the conditions for mixing by folded noncollinear geometry are satisfied, that is, the electric fields of the radiation at the frequency $\omega_3$ are added up in phase.

39. Apparatus as claimed in claim 38 in which said means providing comprises first laser means generating the first laser beam and second laser means generating the second laser beam, in which $\omega_1 > \omega_2 > \omega_3$, and in which the nonlinear medium means is a highly nonlinear crystal having at least two sides that receive and reflect the two input beams, said angle $\theta$ and said direction of propagation of the two input beams being established to effect mixing which gives radiation at a difference frequency $\omega_3$ that propagates axially along the crystal, between said two sides and parallel thereto, the difference frequency $\omega_3$ being generated in a mixing process that effects conversion of the radiation at the frequency $\omega_1$ to radiation at the frequencies $\omega_2$ and $\omega_3$.

40. Apparatus as claimed in claim 38 in which said means for providing is a laser that generates a single laser beam, in which means is provided to divide the radiation into two laser beams which constitute said first beam and said second laser beam and hence, $\omega_1 = \omega_2$, and in which the said nonlinear medium means is a highly nonlinear gas that has small absorption for the radiation at the frequencies $\omega_1$ and $\omega_3$, said radiation at the frequency $\omega_3$ being generated as an $n$th harmonic of $\omega_1$.

41. Apparatus as claimed in claim 38 wherein said nonlinear medium means is a highly nonlinear gas and in which said radiation at the frequency $\omega_3$ is generated as a sum, $\omega_3 = m_1\omega_1 + m_2\omega_2$, where $m_1$ and $m_2$ are integers.

* * * * *